United States Patent [19]

Wirz

[11] Patent Number: 4,697,387

[45] Date of Patent: Oct. 6, 1987

[54] DEVICE FOR GRINDING TOOTH PROFILES OF A ROTATING TOOTHED WORKPIECE

[75] Inventor: Walter Wirz, Pfäffikon, Switzerland

[73] Assignee: Reishauer AG, Zurich, Switzerland

[21] Appl. No.: 882,062

[22] Filed: Jul. 3, 1986

Related U.S. Application Data

[63] Continuation-in-part of Ser. No. 698,660, Feb. 6, 1985, abandoned.

[30] Foreign Application Priority Data

Feb. 10, 1984 [CH] Switzerland ............... 657/84

[51] Int. Cl.$^4$ .................................. B24B 39/00
[52] U.S. Cl. ................... 51/88; 51/95 GH; 51/287
[58] Field of Search ............ 51/95 GH, 105 GG, 287, 51/26, 88, 89

[56] References Cited

U.S. PATENT DOCUMENTS

| | | | |
|---|---|---|---|
| 2,165,386 | 7/1939 | Klomp | 51/287 |
| 2,994,989 | 8/1961 | Bregi | 51/88 |
| 3,006,117 | 10/1961 | Motz | 51/26 |
| 3,060,643 | 10/1962 | Wildhaber | 51/95 GH |
| 3,813,821 | 6/1974 | Takahashi | 51/287 |
| 3,875,635 | 4/1975 | Paulou | 51/287 |
| 4,195,446 | 4/1980 | Angst | |
| 4,559,744 | 12/1985 | Wirz | |

FOREIGN PATENT DOCUMENTS

| | | | |
|---|---|---|---|
| 3401340A1 | 9/1984 | Fed. Rep. of Germany | |
| 663508 | 5/1979 | U.S.S.R. | 51/95 GH |

Primary Examiner—Harold D. Whitehead
Attorney, Agent, or Firm—Sughrue, Mion, Zinn, Macpeak, and Seas

[57] ABSTRACT

Two simultaneously driven worm shaped globoidal tools of identical shape are radially adjustable towards the workpiece having tooth profiles. Their tooth thicknesses are smaller than the tooth gap widths of the finished tooth gaps on the workpiece. The workpiece is supported in a freely rotating manner. One tool is angularly displaced with respect to the other tool with a controlled speed and amount of the angular displacement forcing one tool into contact with only the left side of a tooth profile and the other tool into contact with the right side of a tooth profile. During the angular displacement, the left and right tooth sides are processed simultaneously.

6 Claims, 3 Drawing Figures

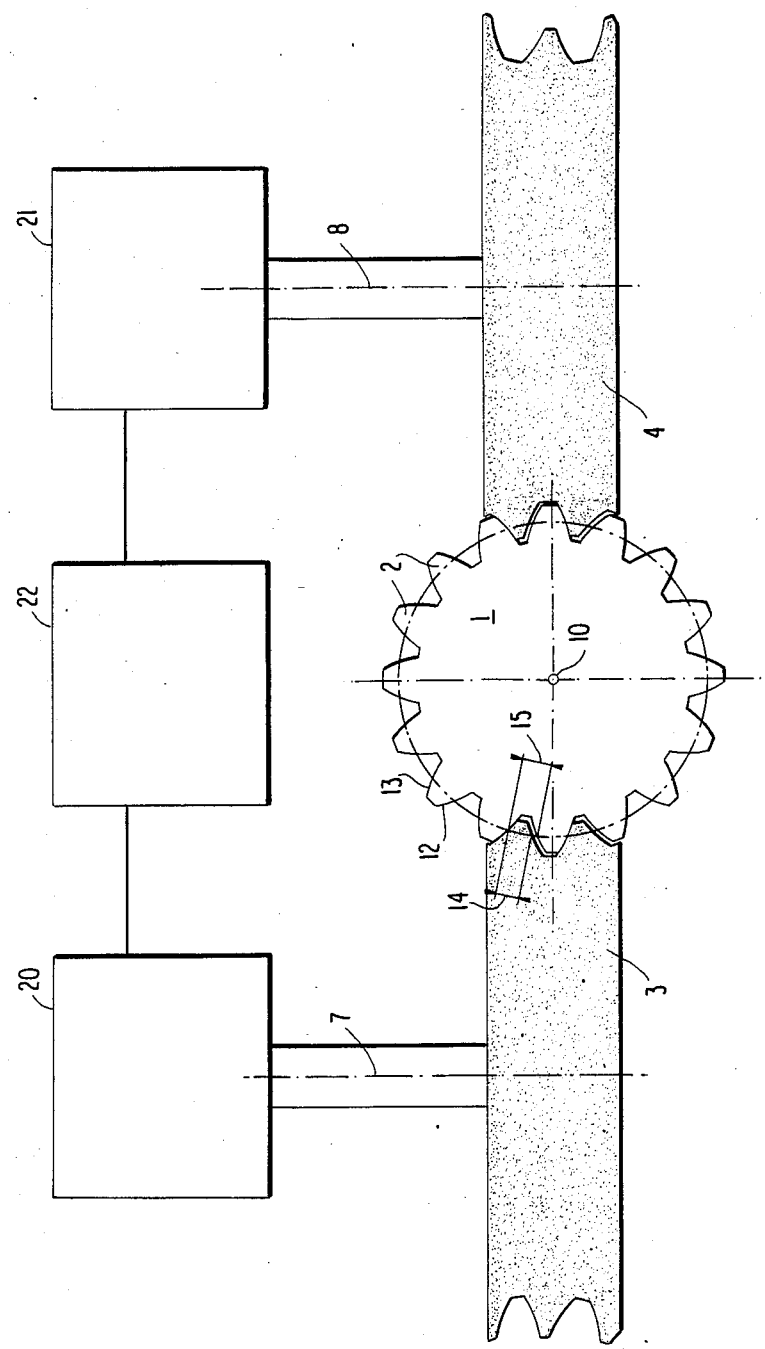

4,697,387

DEVICE FOR GRINDING TOOTH PROFILES OF A ROTATING TOOTHED WORKPIECE

RELATED APPLICATIONS

The present application is a continuation-in-part application of Ser. No. 698,660, now abandoned.

BACKGROUND OF THE INVENTION

The invention pertains to a device for working and particularly grinding tooth profiles on a rotating toothed workpiece.

It is known to grind tooth profiles of a rotating toothed workpiece using at least two driven tools having toothlike protrusions. Such a tool may be a toothed wheel or a worm with its usual toothlike, raised spiral protrusions. The toothlike protrusions, hereinafter referred to simply as the tooth or teeth of the driven tools, have a width smaller than the desired width of the tooth gaps on the finished workpiece. In grinding tooth profiles using such known grinding processes, one driven tool at a time is rotated.

In U.S. Pat. No. 4,559,744 there is disclosed a grinding process using a globoidal worm-type grinding tool having molded teeth of a reduced width. This grinder can be readily adjusted to the desired axial distance relative to the workpiece axis, and thus is readily adjustable relative to the teeth to be ground. After the grinding tool is positioned relative to the teeth to be ground, the left and right tooth profiles are processed, one after the other, by making small angular displacements of the workpiece. As there is a complete, linear contact between the grinding worm profile and the tooth profile of the workpiece when grinding of the rough-work begins, an efficient grinding process is realized. However, there is a limit on the rim width which can be ground using this process.

An improvement in the aforementioned process is described in German Patent Document OS No. 34 01 340. This document describes a grinding process in which the grindable rim width can be enlarged by changing the axial position of the workpiece relative to the grinding worm between the grinding of the left profile and the grinding of the right profile. This process takes into account the fact that the possible contact line between the grinding worm profile and workpiece teeth is unsymmetrical relative to the distance between the workpiece axis and the grinding worm axis.

The two cited processes have the disadvantage that the left and right profiles have to be ground one after the other, which obviously results in an extended processing time. In addition, it is necessary to have a workpiece drive which operates very exactly, is torsion-proof and capable of exactly executing the small relative angular displacement for the rough-work and grinding adjustments.

SUMMARY OF THE INVENTION

It is an object of the invention to provide an improved device, which results in improved productivity notwithstanding simplified machinery for accomplishing the improved productivity.

The improved device of the invention for working tooth profiles and particularly for grinding tooth profiles of a rotating toothed workpiece with helical teeth using at least two driven identically shaped globoidal tools comprises means for mounting the workpiece such that it freely turns, and at least two identically shaped globoidal tools each with toothlike protrusions for engaging the tooth gaps of the workpiece, the width of the protrusions being narrower than the desired width of the finished workpiece tooth gaps.

Means are provided for positioning the tools relative to the axis of the workpiece, the tool axes crossing each other and having equal distance from and forming the same angle with the workpiece axis. The device comprises means for simultaneously rotating the at least two tools in the same direction; and means for imparting a torque to one of said tools relative to another of said tools to thereby shift the workpiece in a manner causing one of said tools to contact only the left side of the workpiece tooth profiles, while another of said tools contacts only the right side of the workpiece tooth profiles. Said means for imparting a torque comprise control means for controlling the speed at which one of the tools is angularly displaced relative to the other and for controlling the position of one tool relative to the other by controlling the amount of angular displacement.

BRIEF DESCRIPTION OF THE DRAWINGS

The invention will be explained with reference to the following drawings in which:

FIG. 2 is a schematic representation of the workpiece and grinding worms of FIG. 1, viewed along the axis of the workpiece.

DETAILED DESCRIPTION OF THE PREFERRED EMBODIMENT

Figure 1:
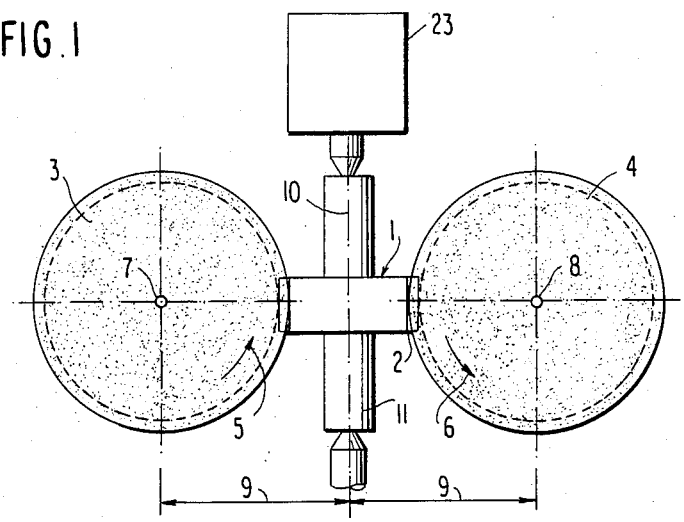
FIG. 1 is a schematic representation of a toothed workpiece with teeth viewed vertical to the axis of the workpiece being processed by two grinding worms driven simultaneously according to the teachings of the invention.

Referring to FIG. 1, a toothed workpiece 1 has helical teeth 2 engaging two globoidal grinding worms 3 and 4. The grinding worms driven by suitable driving devices 20,21 (FIG. 2) rotate in the same direction around axes 7, 8 respectively. The rotational direction of grinding worms 3, 4 are indicated by arrows 5, 6, respectively. The axes 7 and 8 are equally spaced a distance 9 from axis 10 of workpiece 1. The workpiece 1 is mounted in a freely rotating manner on a mounting arbor 11.

Figure 3:
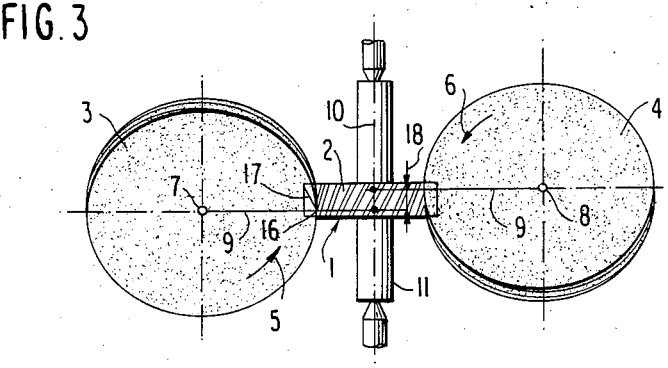
FIG. 3 is a schematic representation of a workpiece being treated by two off-set grinding worms according to the teachings of the invention.

For a better understanding of the invention, the crossing angle between the axes 7 and 8 respectively and the axis 10 of the workpiece 1 is represented to be 90°. In reality that crossing angle is always smaller than 90° and depends on the number of starts of the grinding worms 3, 4. In reality, therefore, the axes 7 and 8 are non-parallel and cross each other, as represented in FIG. 3.

The two tools 3, 4 have identical geometrical shape, i.e. identical tooth profiles, helix angle and number of starts. Therefore, the crossing angle between axes 7 and 10 is the same as the crossing angle between axes 8 and 10.

The profile of the grinding worms 3, 4 can be procuded in a conventional manner using, for example, a rotating trueing tool coated with diamond grains or grains of some other hard material and having tooth dimensions corresponding to that of the workpiece to be processed. The rotating trueing tool rotates against the rotating grinding worms until the desired profile is worked into the circumference of the grinding worms.

Referring now to FIG. 2, it can be seen that a grinding worm only touches the left side 12 or right side 13 of the teeth 2. This is so because the tooth width 14 of the grinding worms is smaller than the desired tooth gap 15 on the workpiece. As a result, the driven grinding worms function to drive the workpiece, eliminating the need for any additional workpiece drive, considerably simplifying the grinding machine. Further, as the contact area between the globoidal grinding worms and the work extend over several teeth, the workpiece is effectively driven by the grinding worms. Additionally, separation errors on the tooth sides present in the rough work are automatically eliminated during the rotation of the workpiece by the rotation of the grinding worms.

As long as the grinding worms 3, 4 rotate synchronously, no grinding is achieved on either the left or right sides of the workpiece teeth 2. What occurs is simply the rotation of the workpiece by the grinding worms much like the operation of a worm gear. However, if one of the grinding worms is angularly displaced or shifted slightly relative to the other as they rotate, a torque is produced causing the grinding worm teeth to move into abrasive contact with the teeth 2 of the workpiece 1. The speed at which the grinding worm moves into abrasive contact with teeth 2 is determined by the speed at which the small relative angular displacement is executed. The positioning of the abrasive contact can be adjusted by controlling the size of the angular displacement. Therefore, the grinding process can be controlled, as needed, by varying the speed and size of the angular displacement. Varying the relative speed of the rotating grinding worms also effects the torque imparted to the one grinding worm relative to the other.

A controller 22 controls the driving devices 20, 21 to assure the synchronous rotation of the grinding worms 3, 4 and to control the relative angular displacement of the worms 3, 4 and the speed of that displacement. A suitable controller is disclosed in U.S. Pat. No. 4,559,774 referred to above.

By grinding the left and right sides of a workpiece tooth with different grinding worms, only one side of the teeth profile on each grinding worm is used. It thus becomes possible to pretreat or rough-work one side of the workpiece teeth with one side of the grinding worm teeth and then finish the opposite side of the workpiece teeth with the still unused side of the grinding worm teeth. Further, the two sides of the grinding worm can have grinding surfaces with different characteristics, or because of varying trueing speeds on the left and right sides of the grinding worm, various types of surface textures can be applied. In order to engage the tool side not used during rough-work, it is only necessary to apply a small relative angular displacement to the grinding worm from the rough-work position. This process provides for a considerable increase in tool life while, at the same time, improving the quality of the finished toothing.

With helical gearing, the processing of the workpiece toothing causes axial as well as tangential and radial forces to act on the workpiece. The axial forces are absorbed by the workpiece support. Though the radial force components effect a bending of the workpiece or its support post, they are not dangerous so long as stiff supporting is used. It is relatively simple to absorb them by arranging the grinding worms symmetrically along the workpiece circumference. This has the effect of causing opposing forces of the same strength to act on the workpiece, eliminating the bending effect. Especially undesirable are the circumferential or tangential forces because they create a momentum on the workpiece which can only be supported by the toothing to be processed. However, it is also possible to simply compensate for these forces by selecting the rotation direction of the grinding worms in such a manner that the resulting momentum on the workpiece becomes zero. With two grinding worms, as in FIG. 1, the rotation directions 5, 6 accomplish this zeroing of the momentum. As can be seen, this also automatically compensates for the axial force components. There only remains one momentum which acts perpendicular to the workpiece axis 10, as well as a radial force which is about twice the grinding force.

It is a characteristic of the grinding process using globoidal tools that the completely finished side surface is not symmetrical to the axis distance 9 (FIG. 3) between the workpiece axis 10 and the tool axes 7 or 8. This results from the fact that the contact line between the tool side and the workpiece toothing 2, which actually defines the processing width, is unsymmetrical with regard to the axis distance 9. In other terms, the contact line is composed of two segments of lengths 16 and 17. The shorter segment 16 extends—when looked at from the plane, containing the axis distance 9, normal to the workpiece axis 10—across that part of the toothing 2 which has to be treated by the lateral surface of tool 3.

The longer segment 17 extends across that part of the toothing 2 which is primarily treated with the circumferential surfaces of the tool 3. Thus, when processing the workpiece with only one tool, it is necessary to shift the workpiece, relative to the tool, along its axial direction, between processing the left and right side of a tooth, if the total possible processing width is to be used. This process is described in detail in the aforementioned German Patent Document OS No. 34 01 340. Contrary to this, it is possible in the process according to the invention, to shift the tool or tools treating the left side the distance 18 (FIG. 3) from the tool or tools treating the right side, whereby permitting the maximum possible rim width on the left and right sides to be procssed simultaneously. FIG. 3 shows the position of tools 3 and 4, here presented as grinding worms, relative to the workpiece 1, while using the total possible processing width.

Where a still wider rim width than the one given by the maximum coverage between tool profile and workpiece toothing is to be processed, the process according to the invention teaches a simple shifting of the workpiece in its axial direction during the processing by a means 23 for imparting reciprocating motion to the workpiece 1 in the direction of its longitudinal axis 10. The relative angular displacement of the workpiece which becomes necessary for helical gearing because of the axial shift, will be accomplished by the tools themselves, which guide the workpiece in the needed rotation speed.

Instead of using only two grinding tools 3, 4 it is possible to use more than two tools for the described processing of the left and right tooth sides of the workpiece. In addition, it is possible to use, for example, the following tools as grinding tools:
globoidal worm or globoidal tooth profiled grinding discs or honing wheels, globoidal worm or globoidal tooth molded metal or synthetic material pieces which are coated with hard material grains on the profiled surfaces, globoidal worm or globoidal tooth molded shaving tools, made from steel, hard metal or coated with hard metal.

In full or semi-automated operations, grinding tools rotate constantly or attain their required rotating speed immediately before contacting the workpiece. In such situations it is necessary to first guide the workpiece relative to the tools to achieve the necessary adjustment between the workpiece to be toothed and the grinding tools. This guided drive procedure is explained in detail in U.S. Pat. No. 4,195,446. Such guided drive of the workpiece extends only to the preliminary and start-up phases of the positioning of the workpiece relative to the tools to achieve a relatively rough installation of the workpiece, and not to the subsequent grinding phase when, according to the invention, the workpiece is freely rotating on its support.

I claim:

1. A device for grinding the tooth profiles of a workpiece with helical teeth comprising:

means for mounting the workpiece such that it freely turns;

at least two identically shaped globoidal tools each with toothlike protrusions for engaging the tooth gaps of the workpiece, the width of the protrusions being narrower than the desired width of the finished workpiece tooth gaps;

the tool axes crossing each other and having equal distance from and forming the same angle with the workpiece axis;

means for simultaneously rotating the at least two tools in the same direction; and means for imparting a torque to one of said tools relative to another of said tools to thereby shift the workpiece in a manner causing one of said tools to contact only the left side of the workpiece tooth profiles, while another of said tools contacts only the right side of the workpiece tooth profiles;

said means for imparting a torque comprising control means for controlling the speed at which one of the tools is angularly displaced relative to the other and for controlling the position of one tool relative to the other by controlling the amount of angular displacement.

2. The device for working tooth profiles of a workpiece as claimed in claim 1, wherein said at least two tools are arranged in pairs with each pair of tools being located at diametrically opposed positions about the workpiece.

3. The device for working tooth profiles of a workpiece as claimed in claim 2, wherein a first tool of a tool pair is located below the longitudinal axis of the workpiece while the second tool of the tool pair is located above said longitudinal axis.

4. The device for working tooth profiles of a workpiece as claimed in claim 1, further including means for imparting reciprocating motion to the workpiece in the direction of its longitudinal axis.

5. The device for working tooth profiles of a workpiece as claimed in claim 1, wherein each of said tools is constructed of a shaped base material having toothlike protrusions and coated with an abrasive material on at least its toothlike protrusions.

6. The device for working tooth profiles of a workpiece as claimed in claim 1, wherein each of said toothlike protrusions of said tools has grinding surfaces of different grinding characteristics on the two flanks of the protrusions.

* * * * *